United States Patent [19]

Larsen

[11] Patent Number: 4,969,794
[45] Date of Patent: Nov. 13, 1990

[54] PORTABLE PALLET TRUCK

[76] Inventor: Kurt K. Larsen, 7123 Skyline Trail, Pell City, Ala. 35125

[21] Appl. No.: 414,710

[22] Filed: Sep. 29, 1989

[51] Int. Cl.$^5$ .......................... B66F 9/06; B21D 53/00
[52] U.S. Cl. ..................................... 414/495; 414/723; 414/785; 280/43.12; 187/9 R
[58] Field of Search ............... 414/495, 608, 723, 785; 280/43.12; 187/9 R

[56] References Cited

U.S. PATENT DOCUMENTS

| | | | |
|---|---|---|---|
| 3,075,661 | 1/1963 | Knutson | 414/723 X |
| 3,353,697 | 11/1967 | Martin et al. | 414/785 X |
| 3,392,858 | 7/1968 | Fernstrom et al. | 414/785 X |
| 3,441,287 | 4/1969 | Leonard et al. | 280/43.12 |
| 3,442,409 | 5/1969 | Larson | 414/495 |
| 3,601,423 | 8/1971 | Goodacre | 280/43.12 |
| 3,666,131 | 5/1972 | Thompson | 414/608 |
| 3,701,211 | 10/1972 | Best | 280/43.12 |
| 3,916,669 | 11/1975 | Schmidt et al. | 414/785 X |
| 4,027,771 | 6/1977 | Adams | 414/495 |
| 4,252,297 | 2/1981 | Swain | 414/495 X |
| 4,475,602 | 10/1984 | Gerstner | 414/785 X |
| 4,514,127 | 4/1985 | Maier | 414/785 X |
| 4,544,324 | 10/1985 | Hornung | 414/785 |
| 4,712,966 | 12/1987 | Gross | 280/43.12 X |

FOREIGN PATENT DOCUMENTS

| | | | |
|---|---|---|---|
| W-13894 | 4/1956 | Fed. Rep. of Germany | 280/43.12 |
| 1093729 | 11/1960 | Fed. Rep. of Germany | 414/785 |
| 2359067 | 3/1978 | France | 414/785 |
| 758270 | 6/1956 | United Kingdom | 280/43.12 |
| 1448653 | 9/1976 | United Kingdom | 187/9 R |
| 1553292 | 9/1979 | United Kingdom | 414/608 |

Primary Examiner—Frank E. Werner
Assistant Examiner—Robert S. Katz
Attorney, Agent, or Firm—Jennings, Carter, Thompson & Veal

[57] ABSTRACT

A knock-down pallet truck utilizes a tubular construction as its fork assembly (43) such that each fork is separately removable from the carriage. Each lightweight fork (43) includes a pair of spaced apart tubular members (39) joined at a tip (41) and affixed to a pair of rigid connection splines (36) which are detachably affixed to a receptacle unit (18, 19) on the body (14) of the pallet truck.

4 Claims, 3 Drawing Sheets

PORTABLE PALLET TRUCK

TECHNICAL FIELD

The present invention relates to materials handling apparatus and more particularly to hand trucks. In even greater particularity the present invention relates to the class of hand trucks known as pallet trucks which included therein a pair of forwardly extending prong-like forks upon which a palletized load may be carried. In even greater particularity the present invention relates to a pallet truck which is readily disassembled for transportation with a palletized cargo.

BACKGROUND ART

Pallet trucks per se have been routinely used for at least the last 25 years. Typically the truck will include a set of closely spaced wheels which are used for steering the truck and which are affixed to a lift mechanism which a carriage assembly and a pair of horizontally extending forks relative to the wheels and floor. The forks have a set of rollers at their free ends which also assist in the lifting and supporting function. All known pallet trucks utilize forks which are in essence solid blades which are welded to the carriage assembly. Consequently, conventional pallet trucks are of limited utility in the sense that, they may only be used with pallets which match their existing fork sizes. Of even greater import, conventional pallet trucks cannot be disassembled for storage or shipment. In certain instances it is desirable to ship the pallet trucks with the cargo to facilitate the unloading thereof. In other instances it is simply desirable to sell the pallet truck to end users in a configuration that permits easy shipment to the destination at which the truck will be used.

Therefore a need exists for a pallet truck which is portable and which can have its forks interchanged as needed.

DISCLOSURE OF THE INVENTION

These and other advantages and features are uniquely accomplished in my invention through a practical combination of elements in a fork construction which permits easy and efficient disassembly and reassembly of the truck. More specifically, the solid prong-like forks of the prior art are made unnecessary by my invention. In their place I use a light weight open-centered fork assembly which uses a set of tubular longitudinal members, a solid lip joining the two and a rigid connecting insert which forms a releasable friction-fit with the carriage assembly. A threaded connection or bolt can be used to securely attach the insert to the carriage assembly, so that it may also be easily removed.

This construction provides numerous advantages over the prior art. For example, the fork length is a major component of truck length which in turn is reflected in the maneuverability of the truck. In my device the forks may be changed to change the length of the truck so that it may be used in a narrower aisle environment. Secondly, the tubular construction provides increased rigidity in the forks with less weight, thereby making the truck more maneuverable.

The ease of assembly and light weight of the truck make it possible to economically ship the truck with its cargo in as much as the weight may be reduced by two-thirds over the prior art, a factor important in terms of weight, space, and shipping cost.

BRIEF DESCRIPTION OF THE DRAWINGS

Apparatus embodying features of my invention are illustrated in he accompanying drawing which form a portion of this disclosure and wherein.

FIG. is a exploded perspective view of my pallet truck.

BEST MODE OF CARRYING OUT THE INVENTION

Figure 1:
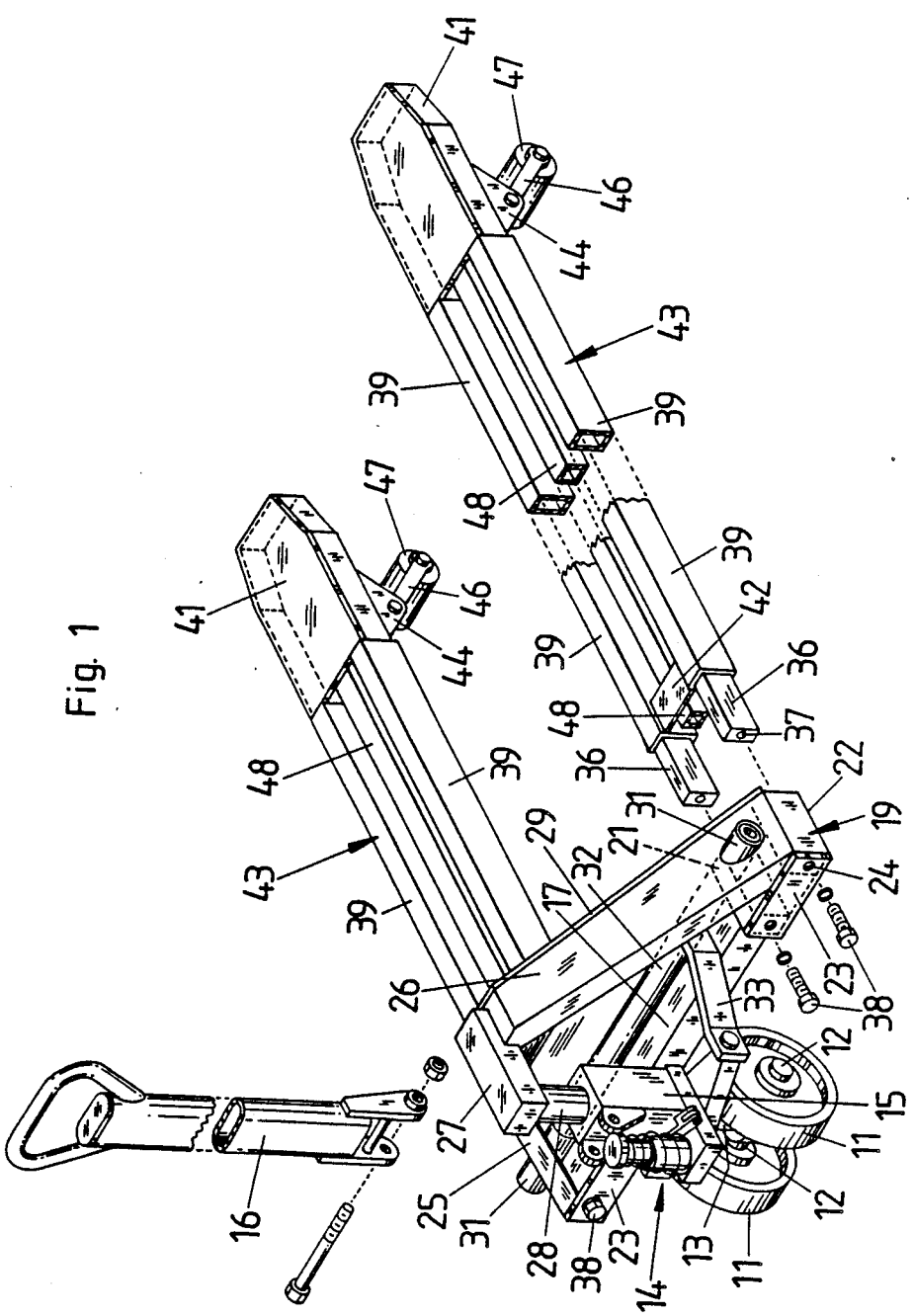
Figure 2:
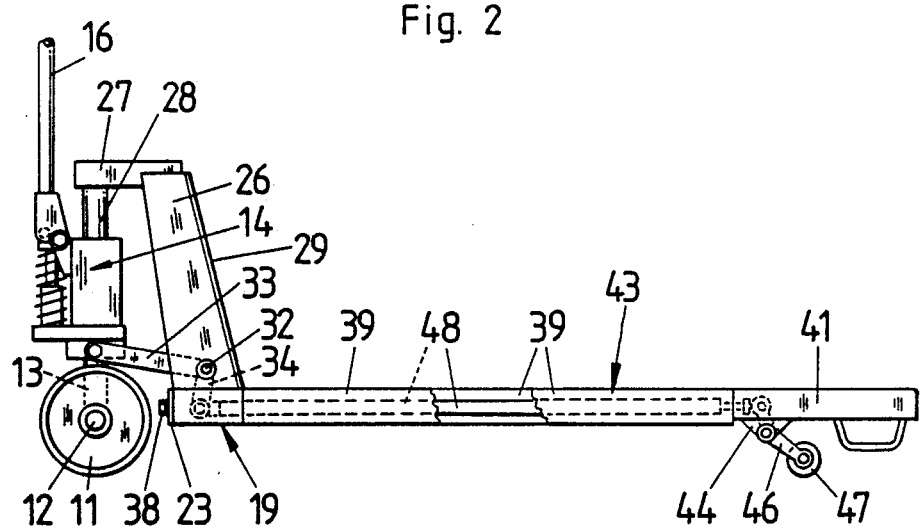
FIG. 2 is a side elevational view of the truck in a lowered position.
Figure 3:
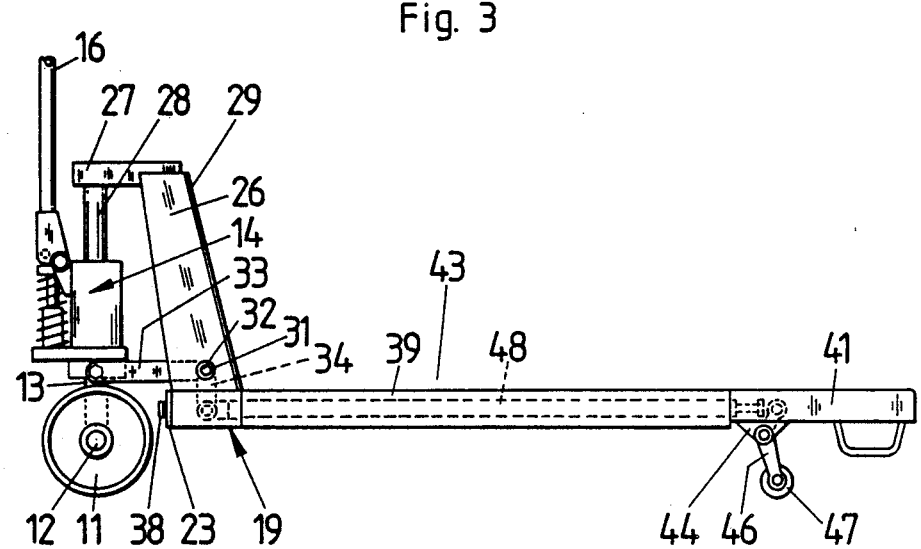
FIG. 3 is a side elevational view of the truck in a raised position.
Figure 4:
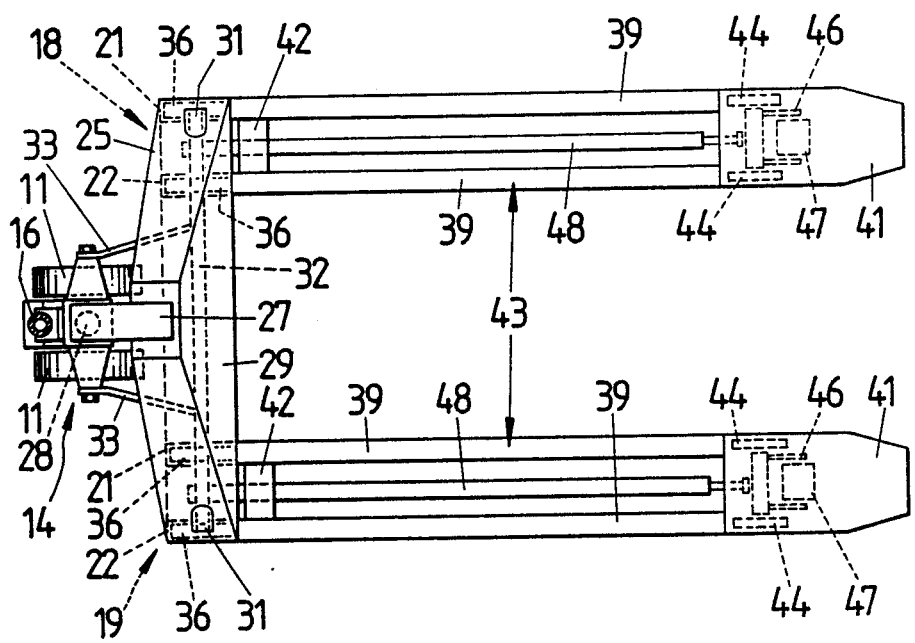
FIG. 4 is a plan view of the truck.
Figure 5:
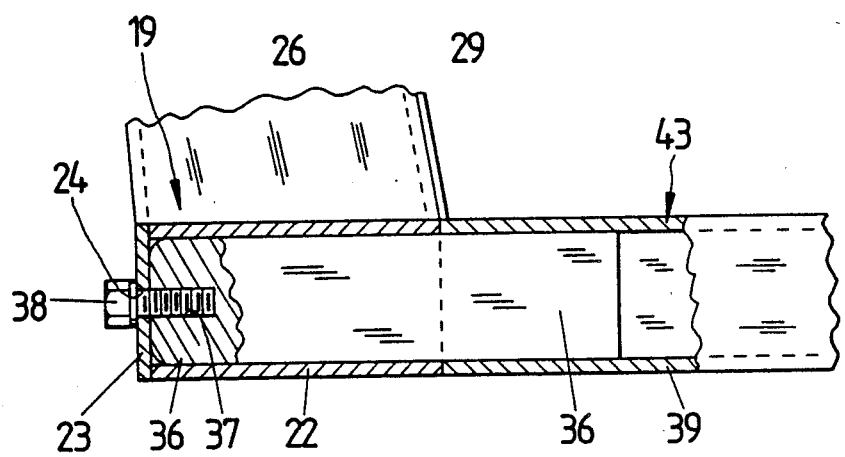
FIG. 5 is a sectional view of the connection of the carriage assembly to the forks.

Referring to the drawings for a clearer understanding of my invention, it may be seen in FIG. 1, that my pallet truck is similar to the prior art in the use of dual wheels 11 mounted on a horizontal axle 12 extending on either side of a vertical shaft 13. A carriage assembly 14 is supported on the shaft 13 and includes a pivotally connected handle 16 which cooperates with a hydraulic lift 15 to raise the center member 27 relative to the wheels 11. The carriage assembly 14 also includes a transverse frame member 17 mounted forwardly of the wheels 11 which is flanked at each end by a pair of receiver units 18 and 19. Each receiver unit includes a pair of tubular receivers 21 and 22 spaced laterally apart and connected by a plate member 23 which closes the receiver on the rear thereof. Each plate member 23 has a pair of apertures 24 therein aligned with the tubular receivers 21 and 22. A pair of angled frame members 25 and 26 are affixed to the top of receiver units and converge to the center member 27 affixed to the top of a column 28. A stop plate 29 is affixed to the forward surfaces of the angled frame member 25 and 26, and a bearing journal 31 is found in each angled frame member 25 or 26, just above the receiver units 18 and 19.

Mounted in the bearing journal 31 is a shaft 32 which is part of the load roller assembly. The shaft 32 has a yoke 33 affixed therefrom and connected to the carriage assembly and a pair of downwardly extending lever arms 34 which are positioned intermediate the tubular receiver 21 and 22 of each receiver unit 18 and 19.

The tubular receivers each receive therewithin a solid connector pin 36 which fits therewithin with very little clearance, thus a friction-fit is formed between the pin and receiver. Each pin 36 has a threaded hole 37 therein which is aligned with aperture 24 such that a threaded connector 38 may pass through the aperture 24 and threadedly engage and retain the pin 36 in the receiver. Each pin 36 extends from the receiver and is affixed within a fork tube 39. The fork tubes 39 are paired and joined at their ends distal the carriage assembly 14 by an end cap 41 and by a spacer plate 42 near the carriage assembly. Each pair of fork tubes 39 and end caps 41 form a removable fork 43 which can be easily replaced if it becomes damaged or if a shorter fork is needed. The end cap 41 includes a pair of depending axle mounts 44 which receive therein a pair of load roller pivots 46 which include a load roller 47 at one end and are connected at the opposite end to a load roller shaft 48 which is connected to the lever arms 34. As will be understood by those familiar with pallet trucks, the actuation of the hydraulic lift 15 by the handle 16 allows the forks to lift the palletized load.

The fork assembly of the present invention is readily removed by removing the threaded connector 38 and pulling the fork from the receptacle, however the fork is not susceptible to accidental release due to the dual action of the friction-fit and the threaded member. It will be appreciated that the open tubular construction provides an excellent strength to weight ratio and thus the pallet truck may be economically shipped with with a cargo load or separately and may be assembled or disassembled with common tools without welding.

While I have shown my invention in one form, it will be obvious to those skilled in the art that it is not so limited but is susceptible of various changes and modifications without departing from the spirit thereof.

What I claim is:

1. A knock-down pallet truck characterized by:
    (a) a carriage assembly supported on a pair of carriage wheels, partially selectively mobile vertically relative thereto, on a vertical shaft intermediate said pair of carriage wheels, said carriage assembly extending laterally of said wheels;
    (b) first and second fork members detachably affixed to said carriage assembly outwardly of said carriage wheels;
    (c) means for moving said fork members vertically relative to an underlying surface,
    (d) said first and second fork members are each characterized by first and second spaced apart linear members and a tip portion interconnected therebetween distal said carriage assembly; and
    (e) each of said linear members are tubular with the ends thereof proximal said carriage assembly being hollow; said hollow ends receiving therein a linear connecting member extending in close fitting engagement with said carriage assembly to provide a rigid connection between said carriage assembly and each fork member.

2. The lift truck as defined in claim 1 further characterized by a threaded fastener associated with each connecting member and securing each connecting member to said carriage assembly.

3. A portable pallet truck characterized by:
    (a) a pair of spaced apart load bearing fork members, each defined by a set longitudinally extending parallel tubular members and a tip portion joining said tubular members at one end thereof;
    (b) a wheeled carriage assembly, and means for detachably affixing said fork member to said carriage assembly including a plurality of rigid insert members each having a first end inserted within said second end of one of said tubular members and a second end inserted within a receptacle found in said carriage assembly, and means for releasably securing said insert members within said carriage assembly.

4. A pallet truck as defined in claim 3 wherein said means for releasably securing is characterized by a threaded bolt extending axially of said inserting member end threadedly engaging said insert member through an aperture in said carriage assembly communication with said receptacle.

* * * * *